United States Patent
Miyazawa

(10) Patent No.: US 7,605,871 B2
(45) Date of Patent: Oct. 20, 2009

(54) VIDEO SIGNAL PROCESSING APPARATUS AND VIDEO SIGNAL PROCESSING METHOD

(75) Inventor: Hirotoshi Miyazawa, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 815 days.

(21) Appl. No.: 11/335,557

(22) Filed: Jan. 20, 2006

(65) Prior Publication Data

US 2006/0158564 A1    Jul. 20, 2006

(30) Foreign Application Priority Data

Jan. 20, 2005    (JP) .............................. 2005-012909

(51) Int. Cl.
 *H04N 9/69* (2006.01)
 *H04N 9/68* (2006.01)
(52) U.S. Cl. ...................... 348/675; 348/645
(58) Field of Classification Search ................ 348/674, 348/712, 713, 645–647, 649–651, 654, 675, 348/687, 708, 254–256; 382/167; 358/518–520; H04N 5/202, 9/69, 9/64, 9/77, 9/68
See application file for complete search history.

(56) References Cited

U.S. PATENT DOCUMENTS 5,351,141 A * 9/1994 Tsuji et al. ................. 348/645
5,457,494 A * 10/1995 Suga et al. .................. 348/254
2002/0186223 A1  12/2002 Sasaki

FOREIGN PATENT DOCUMENTS

| CN | 1381035 A | 11/2002 |
| JP | 11-88902 | 3/1999 |
| JP | 2000-115799 | 4/2000 |
| JP | 2001-103505 | 4/2001 |
| WO | WO 2004/075113 A1 | 9/2004 |

OTHER PUBLICATIONS

Notification of the First Office Action issued by the Chinese Patent Office on Aug. 1, 2008, for Chinese Patent Application No. 200610001495.5, and English-language translation thereof.

* cited by examiner

*Primary Examiner*—Sherrie Hsia
(74) *Attorney, Agent, or Firm*—Finnegan, Henderson, Farabow, Garrett & Dunner, L.L.P.

(57) ABSTRACT

Based on a first table in which a value of an input luminance signal is corresponded to a value of an output luminance signal acquired by performing nonlinear correction processing on the input luminance signal, there is created a second table in which a value of the input luminance signal is corresponded to a value of a color correction signal for performing amplitude control based on the nonlinear correction processing performed on the input luminance signal on an input color signal. The nonlinear correction processing is performed on the input luminance signal based on the first table and the amplitude control is performed on the input color signal based on the second table.

11 Claims, 7 Drawing Sheets

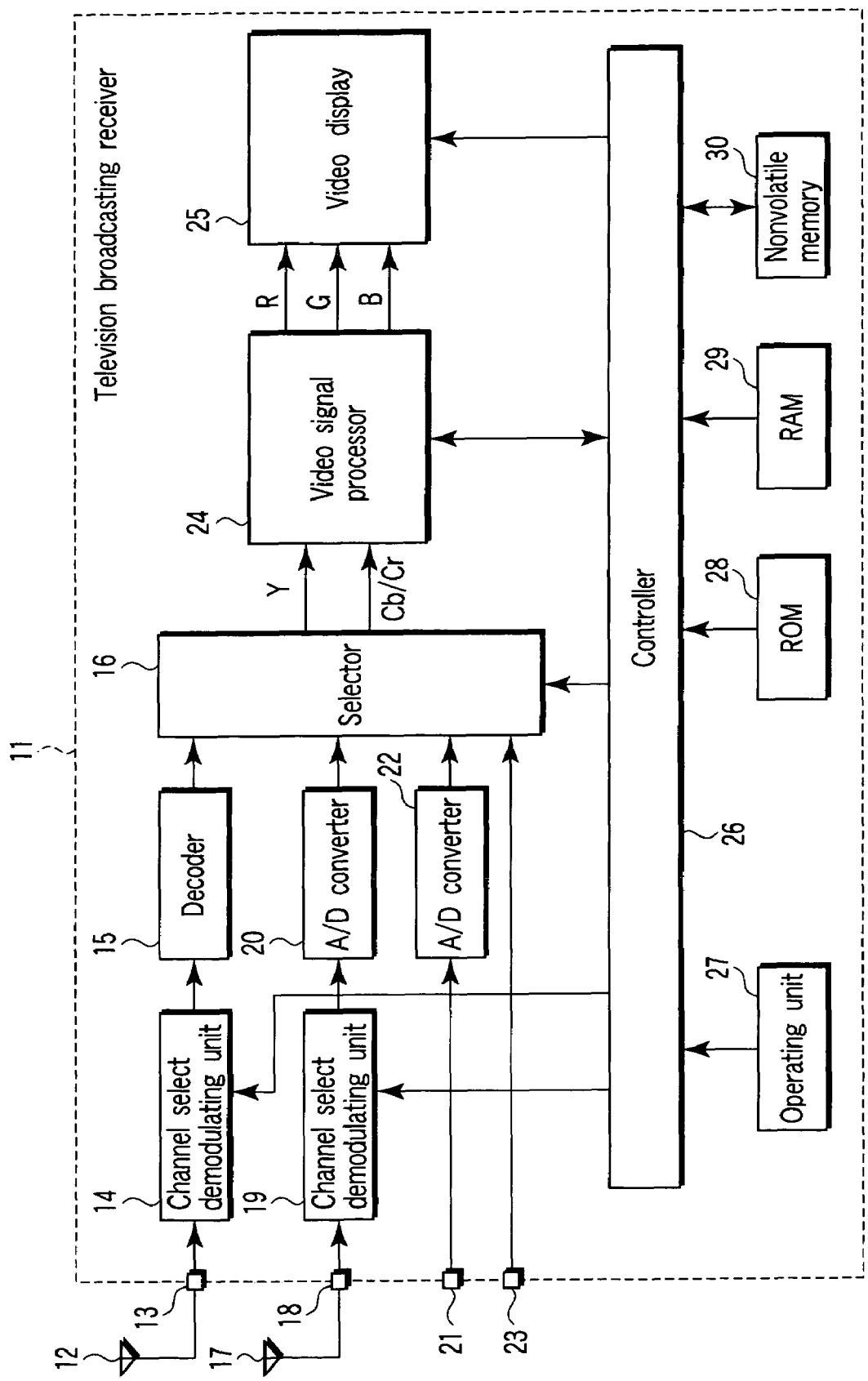
F I G. 1

| Input luminance signal (address) | Output luminance signal |
|---|---|
| 0 | 0 |
| 1 | 1 |
| 2 | 2 |
| ⋮ | ⋮ |
| 253 | 253 |
| 254 | 254 |
| 255 | 255 |

FIG. 4

| Input luminance signal (address) | Color correction signal |
|---|---|
| 0 | 1 |
| 1 | 1 |
| 2 | 1 |
| ⋮ | ⋮ |
| 253 | 1 |
| 254 | 1 |
| 255 | 1 |

FIG. 5

VIDEO SIGNAL PROCESSING APPARATUS AND VIDEO SIGNAL PROCESSING METHOD

CROSS-REFERENCE TO RELATED APPLICATIONS

This application is based upon and claims the benefit of priority from prior Japanese Patent Application No. 2005-012909, filed Jan. 20, 2005, the entire contents of which are incorporated herein by reference.

BACKGROUND OF THE INVENTION

1. Field of the Invention

The present invention relates to improvement in a video signal processing apparatus and a video signal processing method for performing correction processing on a luminance signal and a color signal, respectively.

2. Description of the Related Art

As is well known, for example, in a color television broadcasting receiver and the like, a nonlinear correction processing for gamma-correction is performed on a luminance signal, and a correction processing is performed on a color signal depending on the amount of a change in the luminance signal by this nonlinear correction processing.

In Jpn. Pat. Appln. KOKAI Publication No. 2000-115799, there is disclosed a structure in which a difference between a luminance signal to be input into a gamma-correction circuit and a luminance signal to be output from the gamma-correction circuit is calculated to find the amount of a change in the luminance signal by the gamma-correction so that a color signal is amplified based on a gain depending on the amount of change.

However, in the structure described in the above publication, there are required a subtractor for calculating a difference between luminance signals before and after a gamma-correction circuit, an amplifier for outputting data where a color signal is amplified based on a gain depending on the output of the subtractor and the like, causing a problem that a circuit configuration is complicated and large.

BRIEF SUMMARY OF THE INVENTION

According to one aspect of the present invention, there is provided a video signal processing apparatus comprising: a first creating unit configured to create a first table in which a value of an input luminance signal is corresponded to a value of an output luminance signal acquired by performing nonlinear correction processing on the input luminance signal; a second creating unit configured to create, based on the first table created in the first creating unit, a second table in which a value of the input luminance signal is corresponded to a value of a color correction signal for performing amplitude control based on the nonlinear correction processing performed on the input luminance signal on an input color signal; a nonlinear correcting unit configured to perform nonlinear correction processing on the input luminance signal based on the first table created in the first creating unit; and a color correcting unit configured to perform amplitude control on the input color signal based on the second table created in the second creating unit.

According to another aspect of the present invention, there is provided a video signal processing method comprising: a first step of creating a first table in which a value of an input luminance signal is corresponded to a value of an output luminance signal acquired by performing nonlinear correction processing on the input luminance signal; a second step of creating, based on the first table created in the first step, a second table in which a value of the input luminance signal is corresponded to a value of a color correction signal for performing amplitude control based on the nonlinear correction processing performed on the input luminance signal on an input color signal; and a third step of performing nonlinear correction processing on the input luminance signal based on the first table created in the first step and performing amplitude control on the input color signal based on the second table created in the second step.

BRIEF DESCRIPTION OF THE SEVERAL VIEWS OF THE DRAWING

FIG. 1 shows one embodiment according to the present invention, and is a block configuration diagram for explaining a video signal processing system of a television broadcasting receiver;

FIG. 4 is a view for explaining a LUT for luminance nonlinear correction processing used in the television broadcasting receiver according to the embodiment;

FIG. 5 is a view for explaining a LUT for color correction processing used in the television broadcasting receiver according to the embodiment;

DETAILED DESCRIPTION OF THE INVENTION

Figure 2:
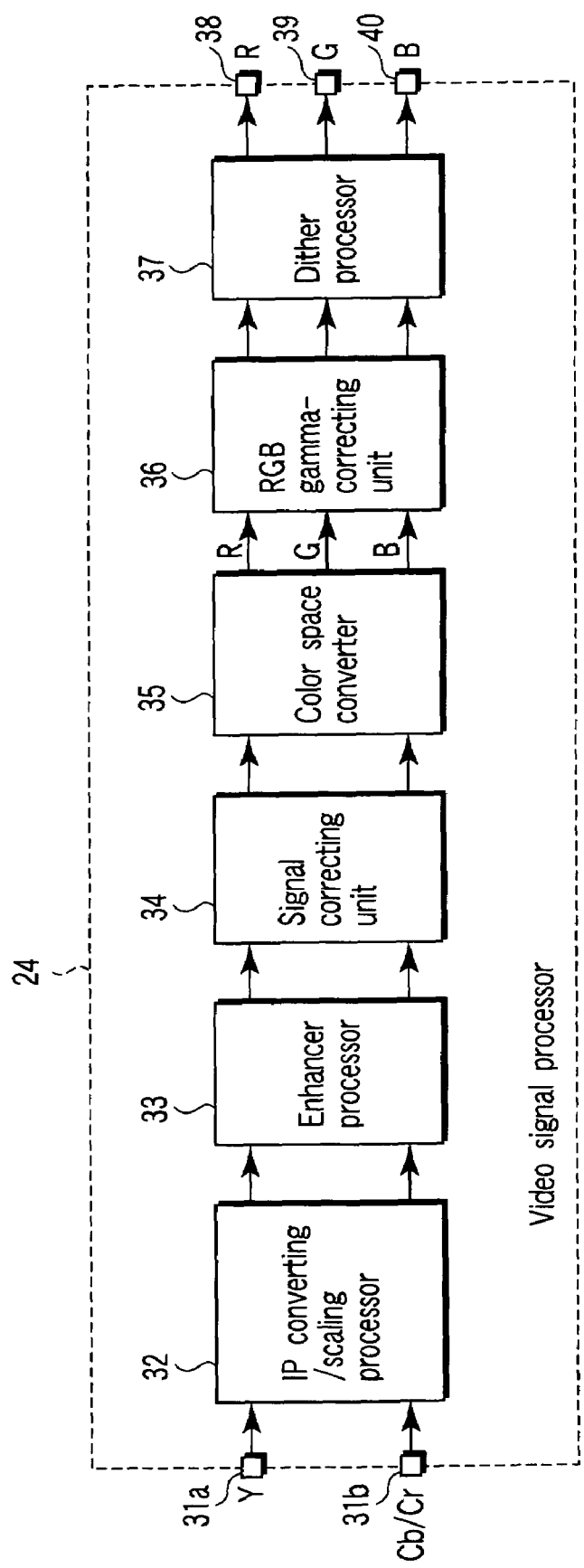
FIG. 2 is a block configuration diagram for explaining a video signal processor in the television broadcasting receiver according to the embodiment.

One embodiment according to the present invention will be described below in detail with reference to the drawings. FIG. 1 schematically shows a video signal processing system of a television broadcasting receiver 11 to be explained in this embodiment.

That is, a digital television broadcasting signal received in a digital television broadcasting receiver antenna 12 is supplied to a channel select demodulating unit 14 via an input terminal 13. This channel select demodulating unit 14 selects a broadcasting signal of a desired channel from the input digital television broadcasting signal, and demodulates the selected signal to output it to a decoder 15.

Then, this decoder 15 performs decode processing on the signal input from the channel select demodulating unit 14, thereby generating and outputting a digital luminance signal Y and color signal Cb/Cr, respectively, to a selector 16.

An analog television broadcasting signal received in an analog television broadcasting receiver antenna 17 is supplied to a channel select demodulating unit 19 via an input terminal 18. This channel select demodulating unit 19 selects a broadcasting signal of a desired channel from the input analog television broadcasting signal, and demodulates the selected signal to generate an analog luminance signal Y and color signal Cb/Cr, respectively.

The analog luminance signal Y and color signal Cb/Cr generated in this channel select demodulating unit 19 are supplied to an A/D (analog/digital) converter 20, where they are converted into digital luminance signal Y and color signal Cb/Cr and are then output to the selector 16.

The analog luminance signal Y and color signal Cb/Cr supplied to an external input terminal 21 for analog video signal are supplied to an A/D converter 22, where they are converted into digital luminance signal Y and color signal Cb/Cr and are then output to the selector 16. Further, the digital luminance signal Y and color signal Cb/Cr supplied to an external input terminal 23 for digital video signal are supplied to the selector 16 as they are.

Here, this selector 16 selects one of the digital luminance signals Y and color signals Cb/Cr supplied from the decoder 15, the A/D converters 20, 22 and the external input terminal 23, respectively, and supplies the same to a video signal processor 24.

This video signal processor 24, described below in detail, performs predetermined signal processing on the input digital luminance signal Y and color signal Cb/Cr to generate R (red), G (green) and B (blue) signals.

The R, G, B signals generated in this video signal processor 24 are supplied to a video display 25 for video display. This video display 25 employs, for example, a flat panel display made of liquid crystal display or plasma display.

The television broadcasting receiver 11 is collectively controlled by a controller 26 in various operations including various receiving operations described above. This controller 26 is a microprocessor incorporating therein a CPU (central processing unit) or the like, which receives operation information from an operating unit 27 including a remote controller (not shown) and controls each unit so as to reflect the operation contents thereof.

In this case, the controller 26 mainly utilizes a ROM (read only memory) 28 storing therein a control program executed by the CPU, a RAM (random access memory) 29 for providing a working area for the CPU, and a nonvolatile memory 30 storing therein various items of setting information and control information, and the like.

FIG. 2 shows one example of the video signal processor 24. That is, the digital luminance signal Y and color signal Cb/Cr selected in the selector 16 are supplied to an interlace progressive (IP) converting/scaling processor 32 via input terminals 31*a*, 31*b*.

The IP converting/scaling processor 32 performs progressive conversion processing and scaling processing on the input luminance signal Y and color signal Cb/Cr for display on the video display 25 (flat panel display made of liquid crystal display or plasma display), and outputs them to an enhancer processor 33.

The enhancer processor 33 performs enhancer processing of making vertical and horizontal rising steep or changing sharpness on the input luminance signal Y and color signal Cb/Cr, and outputs them to a signal correcting unit 34.

The signal correcting unit 34 performs nonlinear correction processing for gamma-correction on the input luminance signal Y, and performs amplitude control processing on the color signal Cb/Cr along with the nonlinear correction processing, and outputs them to a color space converter 35.

The color space converter 35 converts the input luminance signal Y and color signal Cb/Cr into a RGB signal, and outputs to a RGB gamma-correcting unit 36. This RGB gamma-correcting unit 36 performs white balance adjustment for the input RGB signal and performs gamma-correction processing for the video display 25, and outputs them to a dither processor 37.

The dither processor 37 performs, on the input RGB signal, compression processing of converting high tone bit representation which is extended in the number of bits for enhancing representation into low tone bit number corresponding to the video display 25, and then outputs them to the video display 25 via output terminals 38, 39 and 40.

Figure 3:
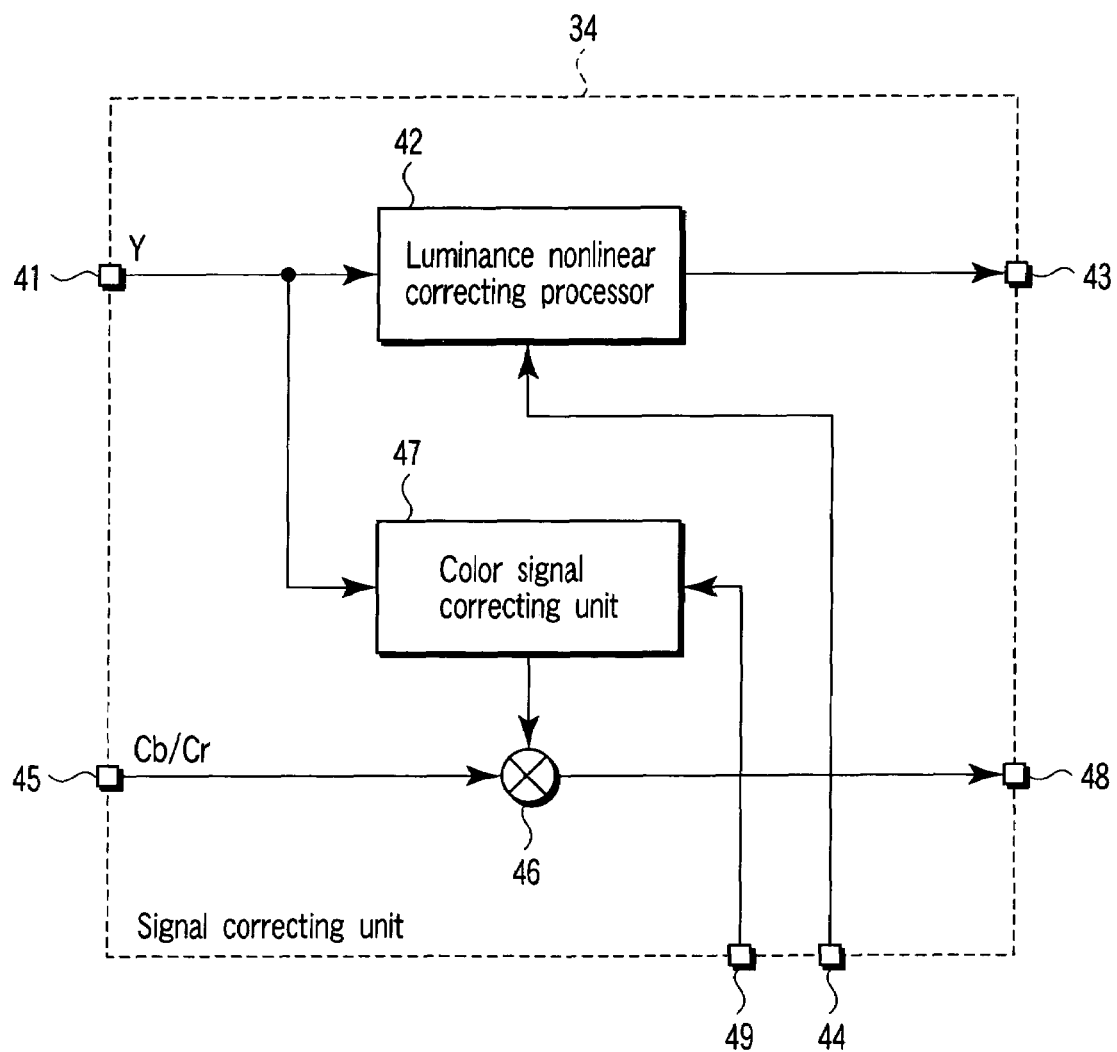
FIG. 3 is a block configuration diagram for explaining a signal correcting unit used in the video signal processor in the television broadcasting receiver according to the embodiment.

FIG. 3 shows one example of the signal correcting unit 34. That is, the luminance signal Y output from the enhancer processor 33 is supplied to a luminance nonlinear correcting processor 42 via an input terminal 41 to be subjected to nonlinear correction processing for gamma-correction, and then is output to the color space converter 35 via an output terminal 43.

Here, the luminance nonlinear correcting processor 42 performs the nonlinear correction processing on the luminance signal Y based on a look up table (LUT) for luminance nonlinear correction processing. This LUT for luminance nonlinear correction processing is a table in which 256 values of 0 to 255 which the input luminance signal Y may take are corresponded to the values of the luminance signal Y to be output in correspondence to the 256 values, respectively, as shown in FIG. 4 when the luminance signal Y is 8-bit data.

In the luminance nonlinear correcting processor 42, assuming that the value of the input luminance signal Y is an address, a value corresponded to the input address value is output as the luminance signal Y which has been subjected to the nonlinear correction processing on the LUT for luminance nonlinear correction processing.

While the LUT for luminance nonlinear correction processing shown in FIG. 4 shows the characteristics where the value of the input luminance signal Y and the value of the output luminance signal Y correspond to 1:1, for example, various nonlinear characteristics can be acquired by changing each value such as converting the value of the output luminance signal Y into 250 at which the value of the input luminance signal Y corresponds to 254.

The LUT for luminance nonlinear correction processing allows the controller 26 to selectively create the one corresponding to several types of characteristics by the calculation processing. For example, the controller 26 can create a LUT of predetermined characteristics based on user's operation or the like and give it to the luminance nonlinear correcting processor 42 via a control terminal 44.

On the other hand, the color signal Cb/Cr output from the enhancer processor 33 is supplied to a multiplier 46 via an input terminal 45 to be subjected to amplitude control processing by being multiplied by a color correction signal output from a color signal correcting unit 47, and then is output to the color space converter 35 via an output terminal 48.

The color signal correcting unit 47 outputs a color correction signal which becomes a color gain for performing amplitude control on the color signal Cb/Cr based on the LUT for color correction processing. The LUT for color correction processing is a table in which 256 values of 0 to 255 which the input luminance signal Y may take are corresponded to the values of the color correction signal to be output in correspondence to the 256 values, respectively, as shown in FIG. 5.

In the color signal correcting unit 47, assuming that the value of the input luminance signal Y is an address, the value corresponded to the input address value is output as the color correction signal on the LUT for color correction processing.

Here, the values of the color correction signal corresponding to the 256 values which the input luminance signal Y may take are calculated by the controller 26 as a ratio between the value of the input luminance signal and the value of the output luminance signal, that is, (value of the output luminance signal Y/value of the input luminance signal Y).

In the LUT for color correction processing shown in FIG. 5, since the controller 26 calculates (value of the output luminance signal Y/value of the input luminance signal Y) based on the LUT for luminance nonlinear correction processing shown in FIG. 4, all the values of the color correction signal assume 1 (even when the values of the output and input luminance signals Y are 0, the calculation result assumes 1).

In other words, when the LUT for luminance nonlinear correction processing is created through calculation, the controller 26 calculates (value of the output luminance signal Y/value of the input luminance signal Y), thereby easily creating the LUT for color correction processing. The controller 26 gives the created LUT for color correction processing to the color signal correcting unit 47 via a control terminal 49.

Figure 6:
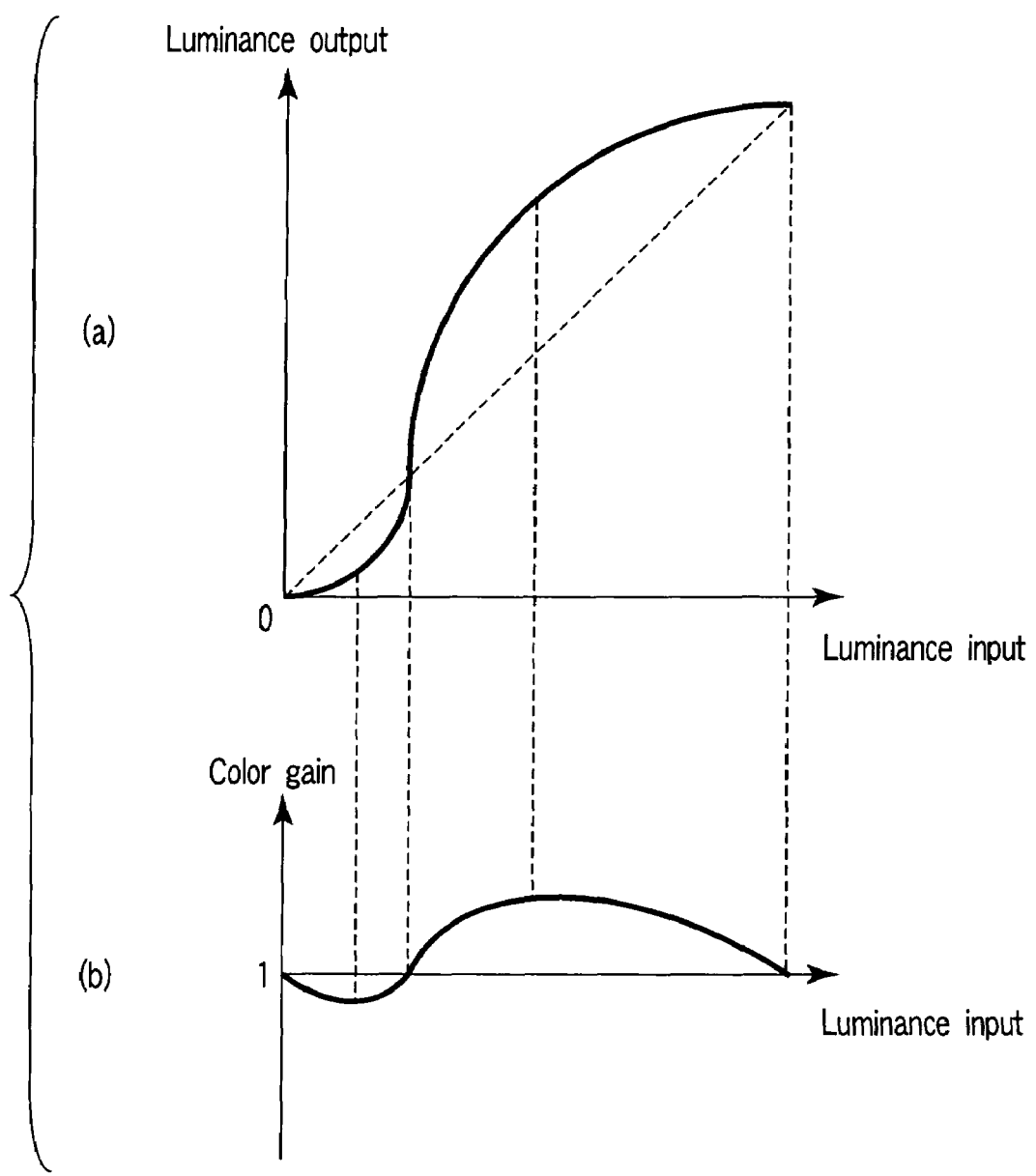
FIG. 6 is a view for explaining luminance nonlinear correction characteristics and color gain characteristics used in the television broadcasting receiver according to the embodiment.

A symbol (a) in FIG. 6 denotes one example of the nonlinear characteristics given to the luminance signal Y by the LUT for luminance nonlinear correction processing. A symbol (b) in FIG. 6 denotes (color gain) characteristics of the color correction signal relative to the input luminance signal Y generated based on the nonlinear characteristics shown by the symbol (a).

Since the color correction signal can be acquired by (value of the output luminance signal Y/value of the input luminance signal Y), when the value of the output luminance signal Y matches with the value of the input luminance signal Y, the resultant value is 1 so that the input color signal Cb/Cr is output as it is. On the contrary, when (value of the output luminance signal Y/value of the input luminance signal Y) is not 1, the calculation value assumes the color correction signal (color gain) to be multiplied by the input color signal Cb/Cr.

Figure 7:
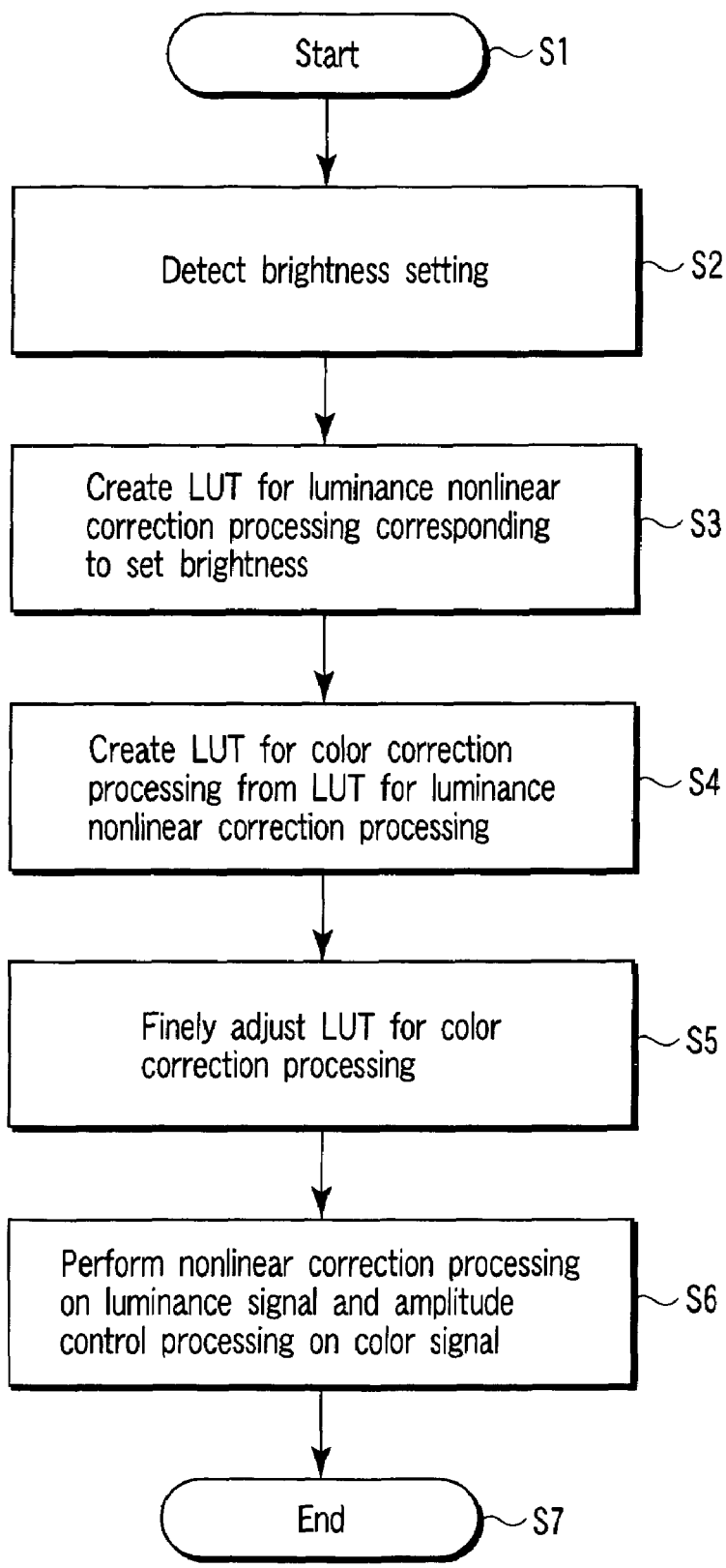
FIG. 7 is a flowchart for explaining a main processing operation of the television broadcasting receiver according to the embodiment.

FIG. 7 shows a flowchart showing a main processing operation of the signal correcting unit 34. That is, when the processing is started (step S1), the controller 26 detects in step S2 that the user has set the brightness of the screen for the video display 25.

Figure 8:
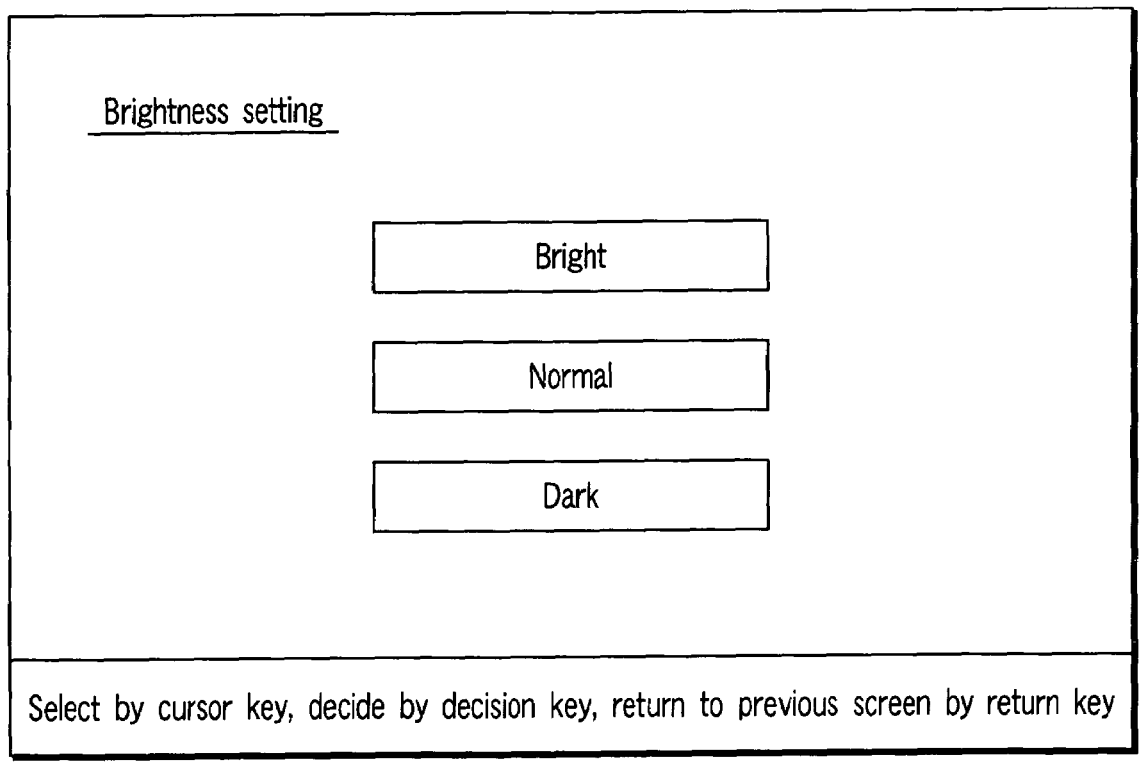
FIG. 8 is a view for explaining one example of a brightness setting screen displayed on the television broadcasting receiver according to the embodiment.

The user operates the operating unit 27 to display a brightness setting screen as shown in FIG. 8 on the video display 25 for this setting. Three items of "bright", "normal" and "dark" are displayed on this brightness setting screen, and any one item is selected by a cursor key of the operating unit 27 and a decision key is operated, thereby setting the brightness.

When the brightness is set on this brightness setting screen, in step S3, the controller 26 creates the LUT for luminance nonlinear correction processing in order to acquire the nonlinear characteristics corresponding to the set brightness through calculation, and sets it in the luminance nonlinear correcting processor 42.

Thereafter, in step S4, the controller 26 creates the LUT for color correction processing by the calculation of (value of the output luminance signal Y/value of the input luminance signal Y) from the created LUT for luminance nonlinear correction processing, and sets it in the color signal correcting unit 47.

The controller 26 performs fine adjustment required for the created LUT for color correction processing in step S5, and causes the signal correcting unit 34 to perform the nonlinear correction processing for the luminance signal Y and the amplitude control processing for the color signal Cb/Cr in step S6, and terminates the processing (step S7).

According to the aforementioned embodiment, the controller 26 creates the LUT for luminance nonlinear correction processing for performing the nonlinear correction processing on the luminance signal Y, and creates the LUT for color correction processing for performing the amplitude control processing corresponding to the luminance nonlinear correction processing on the color signal Cb/Cr based on the calculation from the self-created LUT for luminance nonlinear correction processing.

In other words, there is configured so that the LUT for luminance nonlinear correction processing is used to perform the nonlinear correction processing on the luminance signal Y and the LUT for color correction processing is used to perform the amplitude control processing on the color signal Cb/Cr, and thus each LUT is created by software processing using general-purpose processor.

Therefore, unlike conventionally, there is no need of providing a subtractor for calculating a difference between the luminance signals before and after the gamma-correction circuit, an amplifier for outputting data where a color signal is amplified based on a gain depending on the output of the subtractor, and the like, thereby achieving a small-sized circuit with a simple structure. Further, only a change in software can cope with a change in algorithm of processing contents, which is practical.

The television broadcasting receiver 11 has been described in the above embodiment, but the embodiment is not limited thereto and can be widely applied to, for example, STB (set top box) or other various apparatuses using luminance signals and color signals.

The present invention is not limited to the above embodiment as it is, and can variously modify and embody constituents without departing from the spirit in practical stage. Several constituents disclosed in the above embodiment can be appropriately combined to form various inventions. For example, some constituents can be deleted from all the constituents shown in the embodiment. Further, constituents over different embodiments can be appropriately combined.

What is claimed is:

1. A video signal processing apparatus comprising:
a first creating unit configured to create a first table in which a value of an input luminance signal is corresponded to a value of an output luminance signal acquired by performing nonlinear correction processing on the input luminance signal;
a second creating unit configured to create, based on the first table created in the first creating unit, a second table in which a value of the input luminance signal is corresponded to a value of a color correction signal for performing amplitude control based on the nonlinear correction processing performed on the input luminance signal on an input color signal;
a nonlinear correcting unit configured to perform nonlinear correction processing on the input luminance signal based on the first table created in the first creating unit; and
a color correcting unit configured to perform amplitude control on the input color signal based on the second table created in the second creating unit.

2. A video signal processing apparatus according to claim 1, wherein the second creating unit is configured to calculate a ratio between a value of an input luminance signal and a value of an output luminance signal from the first table created in the first creating unit and to acquire the color correction signal corresponding to the input luminance signal.

3. A video signal processing apparatus according to claim 1, wherein the second creating unit is configured to calculate a value of [value of output luminance signal/value of input luminance signal] from the first table created in the first creating unit and to acquire the color correction signal corresponding to the input luminance signal.

4. A video signal processing apparatus according to claim 1, wherein the first creating unit is configured to crate the first table according to a set screen brightness.

5. A video signal processing apparatus according to claim 1, wherein the color correcting unit comprises:
- a color signal correcting unit configured to acquire the color correction signal corresponding to the input luminance signal based on the second table; and
- a multiplier configured to multiply a color correction signal output from the color signal correcting unit by the input color signal.

6. A video signal processing method comprising:
- a first step of creating a first table in which a value of an input luminance signal is corresponded to a value of an output luminance signal acquired by performing nonlinear correction processing on the input luminance signal;
- a second step of creating, based on the first table created in the first step, a second table in which a value of the input luminance signal is corresponded to a value of a color correction signal for performing amplitude control based on the nonlinear correction processing performed on the input luminance signal on an input color signal; and
- a third step of performing nonlinear correction processing on the input luminance signal based on the first table created in the first step and performing amplitude control on the input color signal based on the second table created in the second step.

7. A video signal processing method according to claim 6, wherein the second step calculates a ratio between a value of an input luminance signal and a value of an output luminance value from the first table created in the first step and acquires the color correction signal corresponding to the input luminance signal.

8. A video signal processing method according to claim 6, wherein the second step calculates a value of [value of output luminance signal/value of input luminance signal] from the first table created in the first step and acquires the color correction signal corresponding to the input luminance signal.

9. A video signal processing method according to claim 6, wherein the first step creates the first table according to a set screen brightness.

10. A video signal processing method according to claim 6, wherein the third step comprises:
- a color correction signal acquiring step of acquiring the color correction signal corresponding to the input luminance signal based on the second table; and
- a multiplying step of multiplying a color correction signal acquired in the color correction signal acquiring step by the input color signal.

11. A broadcasting receiver comprising:
- a receiving unit configured to receive a broadcasting signal;
- a generating unit configured to generate a luminance signal and a color signal from a broadcasting signal received in the receiving unit;
- a first creating unit configured to create a first table in which a value of a luminance signal generated in the generating unit is corresponded to a value of a luminance signal acquired by performing nonlinear correction processing on the luminance signal;
- a second creating unit configured to create, based on the first table created in the first creating unit, a second table in which a value of the luminance signal is corresponded to a value of a color correction signal for performing amplitude control based on the nonlinear correction processing performed on the luminance signal on a color signal generated in the generating unit;
- a nonlinear correcting unit configured to perform nonlinear correction processing on a luminance signal generated in the generating unit based on the first table created in the first creating unit; and
- a color correcting unit configured to perform amplitude control on a color signal generated in the generating unit based on the second table created in the second creating unit.

* * * * *

UNITED STATES PATENT AND TRADEMARK OFFICE
CERTIFICATE OF CORRECTION

PATENT NO.       : 7,605,871 B2                                              Page 1 of 1
APPLICATION NO.  : 11/335557
DATED            : October 20, 2009
INVENTOR(S)      : Miyazawa It is certified that error appears in the above-identified patent and that said Letters Patent is hereby corrected as shown below:

Claim 4, column 7, line 2, change "crate" to --create--.

Signed and Sealed this

Fifteenth Day of December, 2009

David J. Kappos
*Director of the United States Patent and Trademark Office*